(12) United States Patent
Beard et al.

(10) Patent No.: US 10,339,387 B2
(45) Date of Patent: Jul. 2, 2019

(54) AUTOMATED MULTIPLE TARGET DETECTION AND TRACKING SYSTEM

(71) Applicant: Brigham Young University, Provo, UT (US)

(72) Inventors: Randal W. Beard, Orem, UT (US);
Peter C. Niedfeldt, Provo, UT (US);
James K. Ingersoll, Snohomish, WA (US); Patrick Defranco, Missouri City, TX (US)

(73) Assignee: Brigham Young University, Provo, UT (US)

( * ) Notice: Subject to any disclaimer, the term of this patent is extended or adjusted under 35 U.S.C. 154(b) by 123 days.

(21) Appl. No.: 15/449,812

(22) Filed: Mar. 3, 2017

(65) Prior Publication Data
US 2017/0300759 A1  Oct. 19, 2017

Related U.S. Application Data

(60) Provisional application No. 62/303,203, filed on Mar. 3, 2016.

(51) Int. Cl.
*G06K 9/00* (2006.01)
*H04N 7/18* (2006.01)
(Continued)

(52) U.S. Cl.
CPC ........ *G06K 9/00771* (2013.01); *B64C 39/024* (2013.01); *G06K 9/00651* (2013.01); *G06K 9/40* (2013.01); *G06K 9/46* (2013.01); *G06K 9/6202* (2013.01); *G06K 9/6211* (2013.01); *G06T 7/254* (2017.01); *G06T 7/277* (2017.01); *G06T 7/292* (2017.01); *H04N 5/23258* (2013.01); *H04N 5/23267* (2013.01); *H04N 7/181* (2013.01); *H04N 7/183* (2013.01); *H04N 7/185* (2013.01); *B64C 2201/127* (2013.01); *B64C 2201/141* (2013.01); *G06K 2009/3291* (2013.01); *G06K 2209/21* (2013.01); *G06T 2207/10016* (2013.01); *G06T 2207/10032* (2013.01); *G06T 2207/30212* (2013.01); *G06T 2207/30232* (2013.01)

(58) Field of Classification Search
CPC .......... G04G 21/00; G06T 2207/10016; G06T 2207/10032; G06T 2207/30212; G06T 7/277
USPC ............................ 382/103; 701/16; 348/143
See application file for complete search history.

(56) References Cited

U.S. PATENT DOCUMENTS 8,649,557 B2   2/2014  Hyung et al.
8,718,838 B2   5/2014  Kokkeby et al.
(Continued)

OTHER PUBLICATIONS

Niedfeldt, Peter C. et al., "Multiple Target Tracking Using Recursive Ransac", 2014 American Control Conference (ACC), Jun. 4-6, 2014, 6 pages.
(Continued)

*Primary Examiner* — Charlotte M Baker
(74) *Attorney, Agent, or Firm* — Kunzler Bean & Adamson

(57) ABSTRACT

For automated detection and tracking of multiple targets, an apparatus, method, and program product are disclosed. The apparatus includes a camera that captures video data and a processor that compensates for camera motion in the video data, processes the compensated video data to remove noise and spurious returns, detects one or more targets within the processed video data, and identifies target information for each target in the processed video data.

20 Claims, 6 Drawing Sheets

(51) Int. Cl.
*H04N 5/232* (2006.01)
*G06K 9/62* (2006.01)
*G06K 9/40* (2006.01)
*G06T 7/254* (2017.01)
*G06T 7/292* (2017.01)
*G06T 7/277* (2017.01)
*B64C 39/02* (2006.01)
*G06K 9/46* (2006.01)
*G06K 9/32* (2006.01)

(56) References Cited

U.S. PATENT DOCUMENTS

| | | |
|---|---|---|
| 8,744,122 B2 | 6/2014 | Salgian et al. |
| 2009/0315996 A1 | 12/2009 | Guler et al. |
| 2010/0166260 A1 | 7/2010 | Huang et al. |
| 2012/0154579 A1 | 6/2012 | Hampapur et al. |
| 2014/0085462 A1* | 3/2014 | Karlov ............... G06T 7/208 |
| | | 348/143 |
| 2014/0334668 A1 | 11/2014 | Saund |

OTHER PUBLICATIONS

Niedfeldt, Peter C. et al., "Recursive RANSAC: Multipe Signal Estimation with Outliers", 9th IFAC Symposium on Nonlinear Control Systems, Sep. 4-6, 2013, 6 pages.
Niedfeldt, Peter C., " Recursive-RANSAC: A Novle Algorith for Tracking Multiple Targets in Clutter", BYU ScholarsArchive, Jul. 2, 2014, 194 pages.

\* cited by examiner

AUTOMATED MULTIPLE TARGET DETECTION AND TRACKING SYSTEM

CROSS-REFERENCE TO RELATED APPLICATIONS

This application claims priority to U.S. Provisional Patent Application No. 62/303,203 entitled "Vision-Based Automated Multiple Target Detection and Tracking System" and filed on 3 Mar. 2016 for Randal W. Beard, et al., which is incorporated herein by reference.

STATEMENT AS TO RIGHTS TO INVENTIONS MADE UNDER FEDERALLY SPONSORED RESEARCH AND DEVELOPMENT

This invention was made with government support under Grant Number FA8651-13-1-0005 awarded by the Air Force Research Laboratory—Weapons Autonomy Technology Research (AFRL/RWWN). The government has certain rights in the invention.

The subject matter described herein was in-part made possible by support from Utopia Compression (Air Force SBIR) under grant number PO UC2422-BYU-2013-116-0002. The government has certain rights in the invention.

FIELD

The subject matter disclosed herein relates to tracking systems and more particularly relates to automated multiple target detection and tracking.

BACKGROUND

Conventionally, radar systems are used for detection and tracking of multiple targets.

BRIEF SUMMARY

A method for automated detection and tracking of multiple targets is disclosed. An apparatus and program product also perform the functions of the method.

The method includes receiving video data (e.g., from a video camera mounted on a camera platform) and compensating for platform motion. The method includes removing noise and spurious returns from the compensated video data. The method further detects one or more targets within the processed video data and identifies target information for each target in the processed video data.

In certain embodiments, the method includes receiving position information for a vantage point and determining whether a current location (e.g., of the camera platform) matches the vantage point. In response to the current location matching the vantage point, the method includes receiving camera information and target information. For example, another camera platform near the vantage point may provide the camera information and target information. The target information may include one or more of: a number of objects of interest, path information for each object of interest, feature information for each object of interest, position data for each object of interest, error bounds of the position data, and a window of time during which the target information is valid.

The method also includes identifying a set of objects of interest from among the detected one or more targets in the video data based on the target information. The method may further includes taking over target tracking duties from the other camera platform, in response to arriving at the vantage point. In certain embodiments, receiving video data comprises controlling a camera based on the camera information to acquire the video data.

In some embodiments, compensating for platform motion includes applying a geometric transformation to frames of the video data. The geometric transformation may be based on movement data captured by an inertial measurement unit (IMU) coupled to the platform. For example, a homography matrix may be generated based on the IMU data, wherein the homography matrix is used to transform the video data.

In certain embodiments, detecting one or more targets within the video data includes applying a recursive random sample consensus algorithm to the video data to generate contiguous tracks for each moving object in the video data, wherein the video data comprises a sequence of video frames. In some embodiments, the method further includes generating a motion model for each detected target, receiving a new frame of video data, projecting each detected target onto the new frame of video data, and updating the motion model based on the projections.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
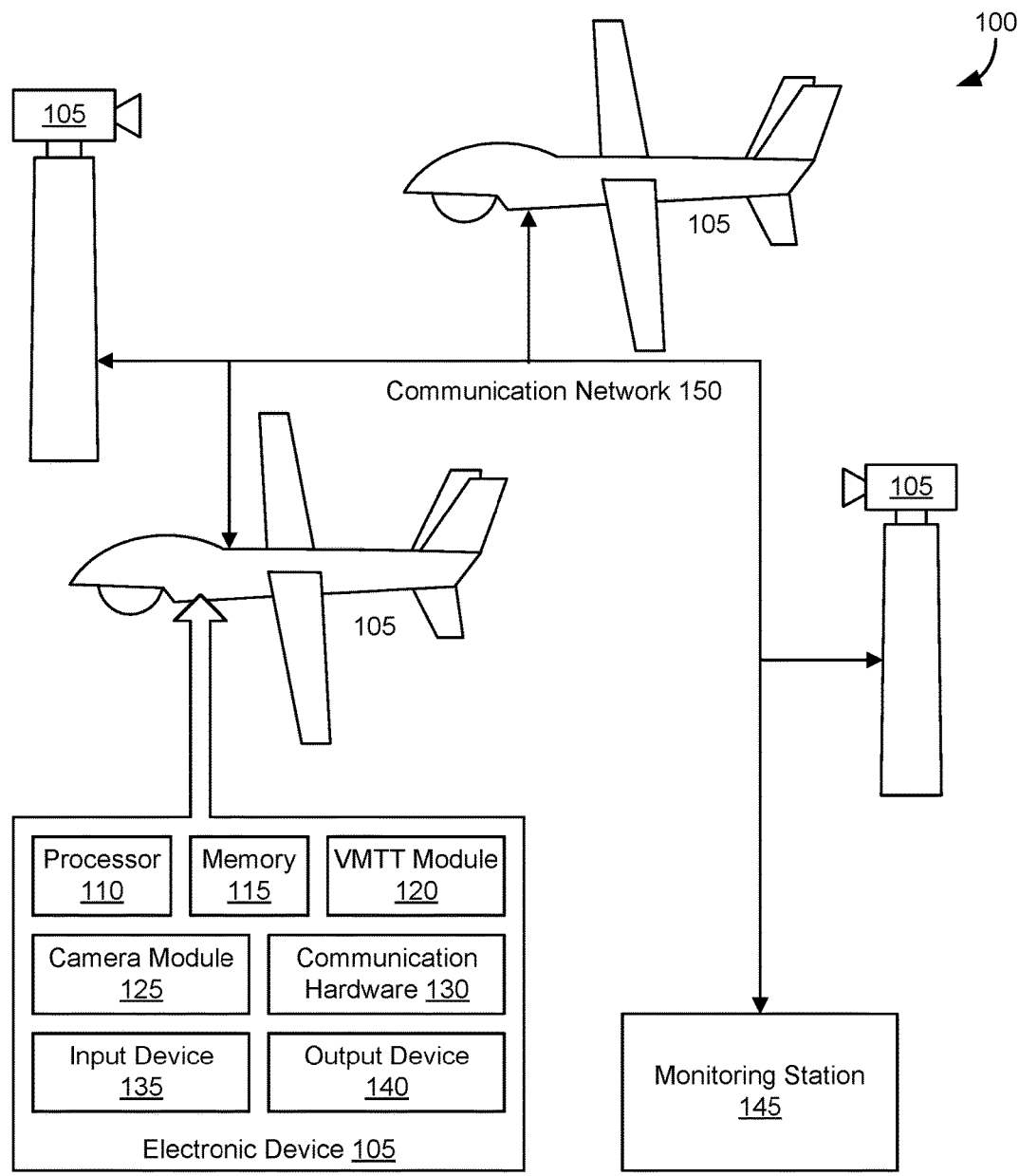
FIG. 1 is a schematic block diagram illustrating one embodiment of a system for automated tracking and detection of multiple targets.

Generally, the systems, apparatus, method, and program products described herein provide for automated tracking and detection of multiple targets. As used herein, "multiple targets" refers to one or more targets. Accordingly, where only one target is present in a field of view, vision-based automated tracking and detection of multiple targets comprises detecting and tracking the single target present in the field of view. Otherwise, where more than one targets are present in the field of view, vision-based automated tracking and detection of multiple targets comprises detecting and tracking the more than one targets present in the field of view. In some embodiments, the disclosed systems, apparatus, and/or methods designate one or more (but fewer than all) of the multiple targets as "objects of interest." As used herein, an "object of interest" refers to a target of specific importance/interest to a user. The disclosed systems/apparatus/methods may be used to track the object of interest among a plurality of targets present in the field of view.

The systems, apparatus, and methods described herein have particular application to video taken from unmanned air vehicles (UAVs) either in flight (moving) or in perch-and-stare (near stationary) tracking scenarios. Given a video sequence and possible information from an inertial measurement unit (IMU) attached to the camera platform (e.g., a UAV), the disclosed systems/methods produce tracks of the targets that are moving in the image. Many targets may coexist in the video sequence, wherein each target will be tracked. Further, the disclosed systems/methods maintain track of a target even when the target is initially moving in the video sequence, and then stops moving.

Disclosed are embodiments of systems, apparatuses, method, computer program products, etc. for vision-based automated multiple target detection/tracking (referred to herein as "vision-based MTT" or "VMTT"). The disclosed embodiments provide for autonomously tracking multiple targets in video taken from a stationary or from a moving platform. While described primarily with respect to UAVs, the disclosed system may also be deployed on static camera platforms, such as fixed security cameras.

Applications particular to UAVs include detecting and monitoring targets in a field of regard, and then tracking these targets as they move. Examples of targets include but are not limited to people walking on the ground and cars driving in urban or rural areas. Applications particular to static camera platforms, such as pan-tilt-zoom security cameras, monitoring public areas (such as airports, train stations, bus stations, and the like) while compensating for camera motion using known geometrical transformations between video frames, due to the system's ability to indefinitely track and detect stationary objects for example, this ability may be used to detect abandoned luggage at a transportation terminal.

Conventionally, radar systems are used for detection and tracking of multiple targets. For example, a radar system may scan an area of the sky where several aircraft are flying about. The radar picks up signals from the different aircraft and uses motion-based tracking techniques to track one or more of the aircraft as they pass along the scanned area of the sky.

Radar data provides range information, but does not provide bearing information. In contrast, video data, such as used in a vision-based MTT system, provides bearing information, but does not provide range information. Thus, in many ways radar data gives the opposite type of information as video data. Additionally, radar data provides limited feature data, for example a radio reflectivity level of an object. In contrast, video data may provide broad feature data useful for identifying and tracking a target. Examples of feature data useful for identifying/tracking a target include, but are not limited to: a color characteristic, a shape characteristic, an edge or corner characteristic, and the like. Accordingly, radar data is sufficiently distinct from video data that techniques used for radar tracking are not easily applied to vision-based tracking.

The disclosed VMTT systems/apparatus/methods, receive a sequence of video frames (for example, captured by an onboard camera), estimate a transformation between the current video frame and a previous frame (e.g., rotation and translation due to camera movement), compensate for camera motion between video frames, and detect/track objects in the video frames. The VMTT system uses computer vision techniques to find positions of objects in the video data and a tracking algorithm to generate contiguous tracks of the objects.

In some embodiments, the tracker portion estimates multiple signals from incoming batches of data. These estimated signals are also referred to as tracks. The VMTT system accounts for all incoming measurements (e.g., from incoming video frames) using track assignment (e.g., associating with an existing track) or track generation. In certain embodiments, Bayesian filtering is used to update the state (e.g., location) estimate and inlier set of each track.

In one embodiment, features are detected in the new frame and matched with features in the previous frame in order to identify objects in the video sequence. In another embodiment, differences between the frames are used to determine which objects move between frames. In some embodiments, a recursive random sample consensus ("R-RANSAC") algorithm is used to dynamically track targets within the video by generating contiguous tracks for each moving object in the video sequence.

In the R-RANSAC algorithm, multiple targets are detected and tracked from the video data. Standard RANSAC algorithms are known to separate inlier data points from outlier data points using a batch process. R-RANSAC uses a standard RANSAC algorithm to generate models (e.g., motion models) from outlier data points at each time interval (e.g., for each video frame). The generated models are then used to test how much of the rest of the data fits the model. Only those models with a high enough percentage of data points that fit the model are kept.

In the VMTT system, the R-RANSAC algorithm runs the standard RANSAC algorithm over a window of video frames. P number of points are selected to form an initial motion model guess. A motion model (also described as a "track") is accepted if the ratio of inliers (e.g., data points falling within the threshold number of pixels to predicted position) to measurements (e.g., data points) is above a threshold ratio and when its age is above a threshold age. Here, the measurements correspond to movement characteristics of an object. The measurements may correspond to position, velocity, and acceleration in at least two dimensions (e.g., X and Y on a grid).

In certain embodiments, the measurements may be based on object movement, feature movement, matching feature points (or templates), and the like. Each target in the video data is tracked over time by associating measurements with a dynamic tracking filter, such as a Kalman filter for each object. The Kalman filter is used to predict the expected states of the object and updates the covariance of the object according to the dynamics of the object and some noise factor, which allows for uncertainty in the model. The Kalman filter is also used to apply the measurements to the states (e.g., update the states). At each prediction step of the filter, movement characteristics (e.g., position, velocity, and acceleration) for the object are updated.

Because only one measurement is taken with each video frame, the recursive-RANSAC algorithm uses a set of video frames (e.g., covering a small window of time) and generates motion models from sets of data points in that window of time. As measurements (e.g., data points) come in, they are tested to see if they are inliers or outliers of some existing motion model. Each motion model belongs to an object being tracked. An object being tracked is not necessarily an object of interest. Rather, an object being tracked is an object distinguishable from other objected in the video data.

If an incoming data point is an inlier to a motion model, then the measurement (data point) is used to update the existing motion model. Otherwise, a measurement that is an outlier to all existing motion models is used to initialize a new motion model, thereby detecting and tracking a new object. The outlier measurement is used with a random subset of measurements to initialize the new motion model. A measurement window is searched for other measurements that support this new model. This process is repeated iteratively and the model with the most support is retained.

After generating a model, recursive RANSAC continues tracking with a dynamic tracker, such as the Kalman filter discussed above. As measurements come in, they are tested to see if they are inliers to some existing model. If so, they are used to update that model. If not, those measurements remain outliers and are used to discover new models.

Only a certain number of accepted models are retained for each tracked object as outputs to the recursive-RANSAC algorithm. As new models are formed, only the models with the highest inlier ratios are kept. Additionally, redundant motion models are identified and removed from the model set. In some embodiments, model merging is used to handle cases where multiple models are formed for single target or where two targets run together.

Object tracking using the R-RANSAC algorithm allows for enhanced ability to track slowly moving objects, as compared to conventional tracking. Additionally, the R-RANSAC algorithm allows for tracking of stationary targets. For continued tracking of stationary objects from a moving camera, a template-based matching method could be used. After R-RANSAC automatically generates tracks from moving object detections, and template is built using the bounding box around the moving object.

At each successive frame, the template is warped according to the detected homography so that it matches the coordinates of the new video frame. The template is matched in a region close to the target track in the direction of prediction motion from the dynamic tracking algorithm (e.g., a Kalman filter) used to track individual targets in R-RANSAC. The template match location will constitute a new measurement to supplement the moving object detection. In certain embodiments, the template update method uses covariance estimates from a dynamic tracker (e.g., from a Kalman filter) as a blending constant, rather than a hardcoded value. In addition, the template update rate could be influenced by the presence of auxiliary measurements, namely the moving object detections.

In some embodiments, the recursive-RANSAC algorithm uses velocity measurements as well as position measurements. Velocity measurements may be used to update the Kalman filters while position measurements alone are used to test incoming measurements. Measurements may be weighed by a velocity difference in the distance to target, with closer velocity and positions having higher weight. The parameters of the recursive-RANSAC model may be adjusted to compensate for image noise, platform movement, terrain of the image capture region, and the like.

FIG. 1 is a schematic block diagram illustrating a system 100 for automated tracking and detection of multiple targets, according to embodiments of the disclosure. The system 100 comprises an electronic device 105. In one embodiment, the electronic device 105 includes a processor 110, a memory 115, a VMTT module 120, a camera module 125, and communications hardware 130. In one embodiment, the electronic device 105 may include an input device 135 and/or the output device 140.

The system 100 is entirely autonomous and thus does not require input from a human user. The system 100 automatically initializes, prunes, and deletes tracks at the appropriate times. The system 100 tracks targets with widely ranging dynamics. The system 100 is capable of robust tracking of highly maneuverable targets while also being capable of detecting and tracking stationary targets. Further, the system 100 is computationally efficient and is therefore able to run in real time. The system 100 has broad security and surveillance applications.

In some embodiments, the electronic device 105 is embodied as a vehicle. Examples of vehicles include, but are not limited to, unmanned vehicles, unmanned aerial vehicles (UAV), and the like. In certain embodiments, the electronic device 105 may be embodied as a camera platform. Examples of camera platforms include, but are not limited to, surveillance cameras, security cameras, closed-circuit television ("CCTV") cameras, and the like. In certain embodiments, the electronic device 105 may be a server, a mainframe computer, or the like. In other embodiments, the electronic device 105 may be a personal computer, including, but not limited to, a mobile phone, a smart phone, a tablet computer, a laptop computer, a handheld computer, a wearable computer, a gaming console, or the like.

In some embodiments, the electronic device 105 may be portable and/or capable of moving itself. A moving electronic device 105 faces additional challenges when tracking multiple targets (both moving and stationary targets) as compared to a stationary electronic device 105. The motion of the electronic device 105 may be from translational motion of the electronic device 105 (e.g., moving from point A to point B) and/or from vibrations, turbulence, or other fine movement of the electronic device 105.

In one embodiment, the system 100 includes only electronic devices 105 embodied in stationary platforms. In another embodiment, the system 100 includes only electronic devices 105 embodied in movable platforms (e.g., vehicles). In other embodiments, the system 100 includes a combination of electronic devices embodied in stationary platforms and electronic devices 105 embodied in movable platforms. Note that a stationary platform may still experience movement, e.g., due to wind or vibrations. Although a specific number of electronic devices 105 are depicted, other embodiments may include fewer or greater numbers of electronic devices 105.

The processor 110, in one embodiment, may comprise any known controller capable of executing computer-readable instructions and/or capable of performing logical operations. For example, the processor 110 may be a microcontroller, a microprocessor, a central processing unit (CPU), a graphics processing unit (GPU), an auxiliary processing unit, a FPGA, or similar programmable controller. In certain embodiments, the processor 110 may include a plurality of processing units, such as a plurality processing cores, a plurality of CPUs, a plurality of microcontrollers, or the like. In some embodiments, the processor 110 executes instructions stored in the memory 115 to perform the methods and routines described herein. The processor 110 is communicatively coupled to the memory 115, the VMTT module 120, the camera module 125, the communications hardware 130, the input device 135, and the output device 140.

The memory 115, in one embodiment, is a computer readable storage medium. In some embodiments, the memory 115 includes volatile computer storage media. For example, the memory 115 may include a random-access memory (RAM), including dynamic RAM (DRAM), synchronous dynamic RAM (SDRAM), and/or static RAM (SRAM). In some embodiments, the memory 115 includes non-volatile computer storage media. For example, the memory 115 may include a hard disk drive, a flash memory, or any other suitable non-volatile computer storage device. In some embodiments, the memory 115 includes both volatile and non-volatile computer storage media.

In some embodiments, the memory 115 stores additional data relating to automated tracking and detection of multiple targets. For example, the memory 115 may store video frames, target identifiers, target features, target location, target orientation, projected target path, target motion history, and the like. In some embodiments, the memory 115 also stores program code and related data, such as an operating system or other controller algorithms operating on the electronic device 105.

The VMTT module 120, in one embodiment, automatically detects and tracks one or more objects in video data, as described in further detail below. Platform movement prevents accurate tracking of objects, as it is difficult to separate platform motion from object motion. As used herein, "platform movement" refers to movement of the camera due to movement of the electronic device 105, movement of the camera with respect to the electronic device 105, and movement due to both movement of the electronic device 105 and movement of the camera with respect to the electronic device 105. The VMTT module 120 includes one or more data processing routines used to compensate for platform movement. Accordingly, the VMTT module 120 is able to more accurately detect and track objects within a field of view.

In some embodiments, the VMTT module 120 uses homography or similar mathematical transformation of image data in order to compensate for platform movement. In one embodiment, two images (e.g., an old image in a new image) of approximately the same field of view are compared to generate a homography matrix. The homography matrix, is a 3×3 matrix estimating camera translation, camera rotation, and scaling (e.g., magnification) information. For example, several features (e.g., corners, edges, or shapes) may be identified in the two images, and their locations compared in order to estimate camera rotation, translation, and scaling. As another example, matching templates (e.g., small parts of the image that match a template image) compared in order to estimate camera rotation, translation, and scaling.

In certain embodiments, the VMTT module 120 estimates platform movement using data from an inertial measurement unit ("IMU") and/or a satellite positioning system (e.g., a GPS navigation system). The IMU is a device that uses a combination of accelerometers and gyroscopes to measure the specific force applied to and angular rate of the electronic device 105. The IMU allows for "dead reckoning" position determination of the electronic device 105.

The satellite positioning system receives radio signals from a plurality of satellites and triangulates the position of the electronic device 105 on the received signals. The VMTT module 120 can estimate the homography matrix using video, the IMU data, and/or the satellite positioning data. In one embodiment, the VMTT module 120 supplements the image comparison data with the IMU/GPS data to generate the homography matrix. Here, IMU/GPS data is synchronized with video-based motion detection (e.g., from image registration) to estimate the platform movement.

From the homography matrix, platform movement due to camera rotation and/or translation may be extracted. This extracted information is then used to cancel out the platform movement, allowing for accurate object detection and tracking. In certain embodiments, the VMTT module 120 uses the homography to map feature location in one frame to expected locations in a second frame. With a stationary object, there will be a small variance between the expected location and the actual location. However, with a moving object, there will be a difference (e.g., statistically significant difference) between the expected locations and actual location, allowing detection of motion between one frame and the next.

In one embodiment, homography-based image registration may be used by the VMTT module 120 to generate a difference image. Here, the VMTT module 120 uses the difference image to mask moving feature points. In certain embodiments, the difference image may be processed using a Gaussian filter and thresholding to generate the mask. In certain embodiments, the VMTT module 120 groups the moving feature points into moving objects. The feature points may also be used to identify and track stationary (or slowly moving) objects in the video sequence.

In certain embodiments, the VMTT module 120 takes all the objects from the old image and uses the homography transformation information to project these objects onto the new image. Then, the VMTT module 120 identifies differences between the projected objects and the captured objects. The VMTT module 120 may use the projection to identify motion of a tracked object that is not accounted for by the platform motion. After compensating for camera movement, the VMTT module 120 tracks both stationary moving objects within the video data (e.g., a sequence of video frames). In some embodiments, the VMTT module 120 uses a combination of motion-based tracking and feature-based tracking of objects within the image data.

While conventional tracking uses homography to find outlier pixels, the VMTT module 120 instead searches for moving features that are outliers from the homography, which is computationally simpler. The detection of moving features allows for easy calculation of object pixel velocity, since the features are already tracked from frame to frame in the process of determining the image homography. Additionally, this allows the VMTT module 120 to simultaneously detect moving objects (e.g., homography-based) from a moving camera while continuing detection when the targets stop moving relative to the scene.

With motion-based tracking, objects are presumed to maintain their motion/path from frame to frame. A filtering algorithm, such as the recursive-RANSAC algorithm discussed above, is used to filter out spurious motion (e.g., impossible and/or highly improbable object motion) and algorithm parameters may be set and/or adjusted to avoid filtering out likely/expected movement of objects within the image data. The VMTT module 120 may track objects between video frames identifying the location of the object in a first video frame and looking for an object at a similar location in a subsequent video frame.

With feature-based tracking, the VMTT module 120 identifies distinguishing features of an object. These features (e.g., feature points) may be edges, corners, shapes, coloring/pattern, or combinations thereof. The VMTT module 120 may track objects between video frames by searching for features of a tracked object near a last known location of the tracked object. For example, the position of the object in the old image is projected onto the new image, and the VMTT module 120 searches for corresponding features (e.g., feature points) of the tracked object near the projected position.

The combination of motion- and feature-based tracking allows the VMTT module 120 to robustly track objects (both stationary and in-motion) from one video frame to the next. For example, several objects may be traveling together, wherein the motion-based tracking is used to track the group quickly/easily, while feature-based tracking is used to identify a particular target within the group.

However, homography assumes a planar surface and further assumes a pinhole camera model. These assumptions imprecisely model reality, resulting in real-world data that does not always conform to the assumptions. For example, trees, buildings, and other three-dimensional objects have the appearance of motion from one video frame to the next due to the effects of parallax and the movement of the electronic device 105. The apparent movement of real-world objects introduces artifacts and noise into the image data. Further, noise in the camera module 125, the electronic device 105, and/or from the environment may add additional noise into the image data.

In some embodiments, the VMTT module 120 filters out the artifacts and noise using the recursive-RANSAC algorithm. In one embodiment, the VMTT module 120 applies the recursive-RANSAC algorithm over multiple frames (e.g., three or more frames) in order to filter out false positives. Using the recursive-RANSAC algorithm allows the VMTT module 120 to look for things (e.g., targets) that move according to certain models. If a target is moving according to the models, then the VMTT module 120 identifies the target as a track. However, the recursive-RANSAC algorithm identifies spurious motion (e.g., motion that does not follow the models) from frame to frame, and these results are filtered out. Thus, the VMTT module 120 is able to filter out platform motion as well as false positives (e.g., spurious motion, artifacts, noise) by using a combination of homography and recursive-RANSAC.

The VMTT module 120 is able to filter out large amounts of noise due to the additional filtering of the recursive-RANSAC. Further, the VMTT module 120 is able to efficiently filter out both camera motion and false positives by using recursive-RANSAC on top of homography, thereby enabling the VMTT module 120 to operate in real-time on an electronic device 105 having limited computational resources. Further, the VMTT module 120 may use a KLT filter of sufficient computational simplicity to allow real-time operation.

In some embodiments, the VMTT module 120 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

The camera module 125, in one embodiment, is configured to capture a sequence of images, referred to herein as "video data." The counter module may include one or more image sensors for capturing the images. In some embodiments, the camera module 125 may include one or more lenses for capturing an image of the field of view. Examples of the one or more lenses include, but are not limited to, a telephoto lens, a wide-angle lens, and the like. Additionally, the camera module 125 may include one or more filters (digital and/or analog). For example, the filters may filter out certain wavelengths of light, may apply preprocessing to the digital images, and the like.

In certain embodiments, the camera module 125 includes a digital camera and a camera mount. The camera mount allows the digital camera to move its orientation with respect to the electronic device 105. For example, the camera mount may allow the digital camera to sweep across a scene. As another example, the camera mount may allow the digital camera to remain oriented at a certain geographic location while the electronic device 105 moves past the geographic location.

The communications hardware 130, is configured to communicate with one or more external modules, computers, data repositories, and the like. In some embodiments, one or more instructions may be received at the electronic device 105 and via the communications hardware 130. In other embodiments, data may be received via the communications hardware 130, including video frames, target information, and the like. The communications hardware 130 may be wired and/or wireless. In certain embodiments, a first electronic device 105 may communicate with a second electronic device 105 via the communications hardware 130.

In one embodiment, the electronic device 105 may communicate with a monitoring station 145. For example, the electronic device 105 may periodically report target tracking data to the monitoring station 145. As another example, the electronic device 105 may receive instructions from the monitoring station 145 as to a field of view where the electronic device 105 should capture video data. In yet another example, the electronic device 105 may receive instructions and/or data regarding an object of interest that the electronic device 105 is to track.

The input device 135, in one embodiment, may comprise any known computer input device including a touch panel, a button, a keyboard, and the like. The input device 135 is configured to receive input from a user, for example touch input, key press input, and the like. In certain embodiments, the input device 135 may include a microphone or other suitable device for receiving voice input from the user. For example, the user may speak one or more commands, wherein input device 135 receives one or more commands as voice input.

In one embodiment, the input device 135 includes a touch-sensitive portion, such as a touch-sensitive input panel, configured to receive touch input from the user, such as an input gesture. In some embodiments, at least the touch-sensitive portion of the input device 135 may be integrated with the output device 140, for instance as a touchscreen or similar touch-sensitive display.

The output device 140, in one embodiment, may comprise any known electronic display capable of outputting visual data to a user. As used herein, the output device 140 refers to a physical, electronic display component of the electronic device 105. For example, the output device 140 may be an LCD display, an LED display, an OLED display, a projector, or similar display device capable of outputting images, text, characters, and the like to a user. The output device 140 may display a user interface, such as a graphical user interface (GUI).

In some embodiments, the output device 140 may be integrated with at least a portion of the input device 135. For example, the output device 140 and a touch panel of the input device 135 may be combined to form a touchscreen or similar touch-sensitive display. The output device 140 may receive data for display from the processor 110, the memory 115, the VMTT module 120, and/or the camera module 125.

In certain embodiments, an electronic device 105 may omit the input device 135 and/or an output device 140 to decrease physical size/weight, to decrease cost, to decrease power requirements, to comply with regulatory and/or mission requirements, and the like. For example, where the electronic device 105 is embodied as an unmanned aerial vehicle (UAV), it may omit the input device 135 and the output device 140 in order to save weight, reduce size, decrease costs, and/or reduce power requirements. Where the electronic device 105 does not contain an input device 135 and/or an output device 140, the electronic device 105 may be communicatively coupled with an external input device and/or output device via the communications hardware 130. Thus, the electronic device 105 may receive user commands and/or instructions from a remote input device and display data to a user at a remote output device using the communications hardware 130.

Figure 2:
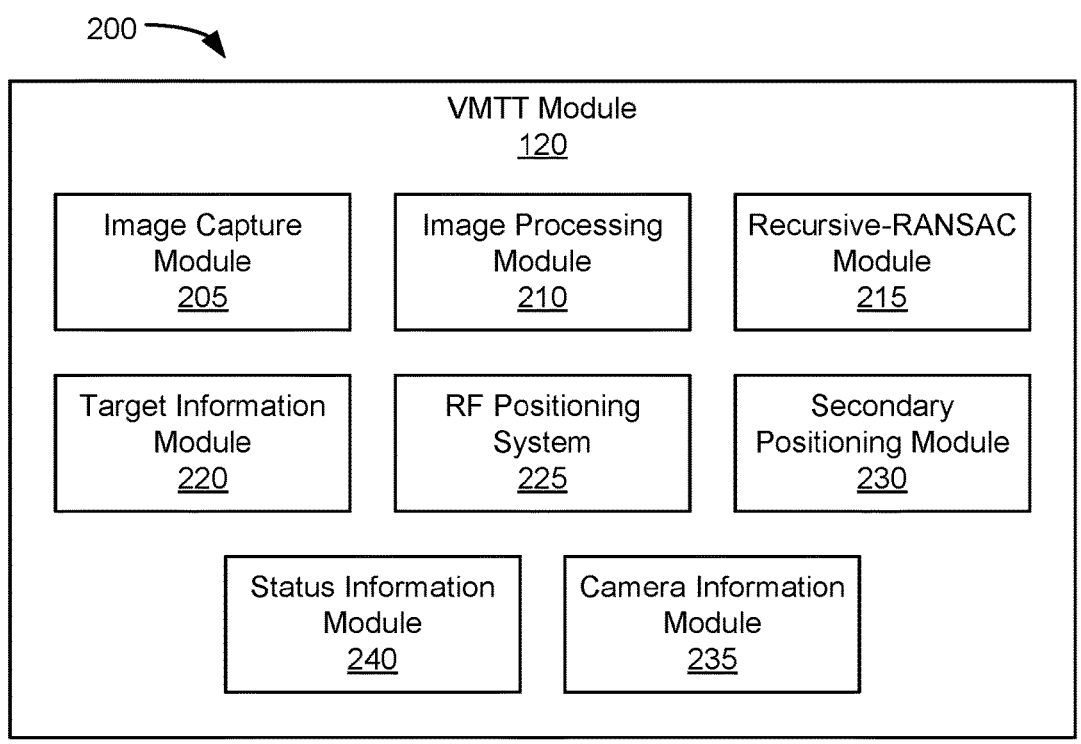
FIG. 2 is a schematic block diagram illustrating one embodiment of an apparatus for automated tracking and detection of multiple targets.

FIG. 2 is a schematic block diagram illustrating an apparatus 200 for automated tracking and detection of multiple targets, according to embodiments of the disclosure. The apparatus 200 includes a VMTT module 120. In some embodiments, the VMTT module 120 is substantially similar to the VMTT module 120 described above with reference to FIG. 1. In one embodiment, the VMTT module 120 includes an image capture module 205, an image processing module 210, a recursive-RANSAC module 215, a target information module 220, a camera information module 235, and a status module 240. In some embodiments, the VMTT module 120 may also include an RF positioning module 225 and/or a secondary positioning module 230. The modules 205-240 may be communicatively coupled to one another. The VMTT module 120 may be implemented using hardware (e.g., circuitry), software, or combinations thereof. In one embodiment, the VMTT module 120 is implemented by a computing processor executing code stored in a memory device.

The image capture module 205, in one embodiment, is configured to receive video data from the camera module 125. As used herein, "video data" refers to a sequence of images, for example sequence of video frames, captured by the digital camera. In some embodiments, the image capture module 205 may control the camera module 125 to capture images of certain location, at a certain time, or the like. In certain embodiments, the image capture module 205 may create a pixel histogram of the region within a frame of the video data. For example, the pixel histogram may be used to identify feature of an object of interest. The image capture module 205 may be implemented using hardware (e.g., circuitry), software, or combinations thereof. In one embodiment, the image capture module 205 is implemented by a computing processor executing code stored in a memory device.

The image processing module 210, in one embodiment, is configured to process the video data received by the image capture module 205. In one embodiment, the image processing module 210 uses homography to cancel out platform motion in the video data, as discussed above. In certain embodiments, the image processing module 210 may apply additional image processing to the video data, such as image stabilization, edge enhancement, image sharpening, image smoothing, and the like. For example, the image processing module 210 may pre-filter the video data before passing it to the recursive-RANSAC module 215. The image processing module 210 is configured to output process video data, for example video data for which platform motion is cancelled out.

In one embodiment, the image processing module 210 extracts feature points for objects in the video data (e.g., objects being tracked). The feature points may include corners, textures areas, or other pixel groups with a strong gradient. In certain embodiments, the image processing module 210 updates the feature points to add or remove feature points associated with an object, for example as the object rotates relative to the camera, moves into/from shadow, becomes partially obscured, and the like. As discussed above, feature points may be used to track moving and stationary objects. The image processing module 210 may be implemented using hardware (e.g., circuitry), software, or combinations thereof. In one embodiment, the image processing module 210 is implemented by a computing processor executing code stored in a memory device.

The recursive-RANSAC module 215, in one embodiment, is configured to apply the recursive-RANSAC algorithm discussed above to video data received from the image processing module 210. The recursive-RANSAC module 215 is used for automated tracking and detection of multiple targets. In certain embodiments, many targets may coexist in the video data (e.g., sequence of video frames) and the recursive-RANSAC module 215 tracks each target. As discussed above, the recursive-RANSAC module 215 filters out noise and spurious motion from the received video data. The recursive-RANSAC module 215 identifies, for each target in the video data, both position data and variance of the position data. In some embodiments, the recursive-RANSAC module 215 also identifies a path or motion profile of a target.

In certain embodiments, the recursive-RANSAC module 215 is used to filter out incorrect feature pairs prior to homography. For example, a feature matching algorithm may be used to generate pairs of "matching" features. One example of a feature tracking algorithm is the Kanade-Lucas-Tomasi (KLT) algorithm that matches regions of successive images by minimizing differences between "patches" surrounding a feature point. The KLT approach becomes more computationally complex as the patch size increases, but is more likely to generate a false match as patch size decreases. As incorrectly paired features lead to a skewed homography solution, the recursive-RANSAC module 215 may be used to apply the RANSAC algorithm to the feature pairs in order to identify outlier pairs, which will then be eliminated from the data set before estimating the homography. In doing so, the Kanade-Lucas-Tomasi (KLT) algorithm can remain computationally simple to support real-time tracking, while the R-RANSAC algorithm minimizes error by identifying and removing outlier feature pairings.

Beneficially, if targets are moving when they are first seen in the video sequence, and then stop moving, the recursive-RANSAC module 215 is able to maintain a track on the target. The recursive-RANSAC module 215 may be implemented using hardware (e.g., circuitry), software, or combinations thereof. In one embodiment, the recursive-RANSAC module 215 is implemented by a computing processor executing code stored in a memory device.

The target information module 220, in one embodiment, is configured to collect and store information for identifying each object of interest. The target information may include a number of objects of interest, path information for each object of interest, feature information for each object of interest, position data for each object of interest, error bounds of the position data, a window of time during which the target information is valid, and the like. In some embodiments, the target information module 220 writes the target information to the memory 115. In certain embodiments, the target information module 220 provides the target information to the communications hardware 130 for transmission to another electronic device 105 and/or the monitoring station 145. The target information module 220 may be implemented using hardware (e.g., circuitry), software, or combinations thereof. In one embodiment, the target information module 220 is implemented by a computing processor executing code stored in a memory device.

The RF positioning module 225, in one embodiment, is configured to detect a RF signal having a particular characteristic (e.g., frequency, timing, and/or modulation), and to identify a direction (e.g., bearing) of a source of the RF signal. In some embodiments, the RF positioning module 225 may provide the bearing to an autopilot or similar navigation control unit, so as to move the electronic device 105 towards the source of the RF signal. In certain embodiments, the RF positioning module 225 is also configured to determine when the RF signal is above a threshold signal strength. The RF positioning module may use one or more radio receivers of the communications hardware 130 to detect the RF signal.

In certain embodiments, the RF positioning module 225 is configured to generate a RF signal to be used by another vehicle to navigate towards the vehicle containing the VMTT module 120. For example, the RF positioning module 225 may generate a RF signal having particular radio characteristics (e.g., frequency, timing, and/or modulation). Further, the RF positioning module 225 may control the communications hardware 130 to transmit the generated RF signal. The RF positioning module 225 may be implemented using hardware (e.g., circuitry), software, or combinations thereof. In one embodiment, the RF positioning module 225 is implemented by a computing processor executing code stored in a memory device.

The secondary positioning module 230, in one embodiment, is configured to precisely guide the electronic device 105 (e.g., embodied as a vehicle) to a specific vantage point. In one embodiment, the secondary positioning module 230 includes a LIDAR system. In another embodiment, the secondary positioning module 230 includes a camera system. The secondary positioning module 230 may be used when the electronic device 105 is within a predetermined distance of another electronic device 105 or within a predetermined distance of a landmark, waypoint, or other navigational feature. For example, when the RF positioning module 225 detects that the RF signal strength exceeds a predetermined level it may activate the secondary positioning module 230 and/or signal the secondary positioning module 230 to begin precision guidance.

In some embodiments, the secondary positioning module 230 is used to precisely identify the vantage point with respect to the electronic device 105, and compute directions that lead the electronic device 105 to the vantage point. The vantage point may be a single point, an area, or a volume of space. In certain embodiments, the vantage point may be a moving location, such as a position relative to a moving vehicle. In one embodiment, the vantage point is representable using three-dimensional coordinates. The secondary positioning module 230 may be implemented using hardware (e.g., circuitry), software, or combinations thereof. In one embodiment, the secondary positioning module 230 is implemented by a computing processor executing code stored in a memory device.

The camera information module 235, in one embodiment, is configured to collect and store camera information. The camera information may include camera parameters, camera bearing, a camera zoom level, and the like. In some embodiments, the camera information may include a position of an object of interest relative to the electronic device 105, the location of a monitored a geographic region relative to the electronic device 105, or the like. The camera information a second electronic device 105 to point its digital camera at the object of interest and/or the monitored geographic region. In some embodiments, the camera information module 235 writes the camera information to the memory 115. In certain embodiments, the camera information module 235 provides the camera information to the communications hardware 130 for transmission to another electronic device 105 and/or the monitoring station 145. The camera information module 235 may be implemented using hardware (e.g., circuitry), software, or combinations thereof. In one embodiment, the camera information module 235 is implemented by a computing processor executing code stored in a memory device.

The status information module 240, in one embodiment, is configured to determine a target tracking status of the electronic device 105. For example, if the electronic device 105 is received instructions to track a specific object of interest, then the status information module 240 may determine whether the electronic device 105 has detected and is tracking said object of interest. In some embodiments, the status information module 240 writes the status information to the memory 115. In certain embodiments, the status information module 240 provides the status information to the communications hardware 130 for transmission to another electronic device 105 and/or the monitoring station 145. The status information module 240 may be implemented using hardware (e.g., circuitry), software, or combinations thereof. In one embodiment, the status information module 240 is implemented by a computing processor executing code stored in a memory device.

The disclosed embodiments have broad security and surveillance applications in the civilian and defense markets. Surveillance applications include detecting and monitoring targets in a field of regard, and then tracking those targets as they move. Targets may include people walking on the ground, or cars driving in urban or rural areas. Additional surveillance applications include monitoring of public areas such as airports, train stations, or bus stations because of its ability to indefinitely track and detect stationary objects. For example, the disclosed systems may be used for abandoned luggage detection.

Figure 3A:
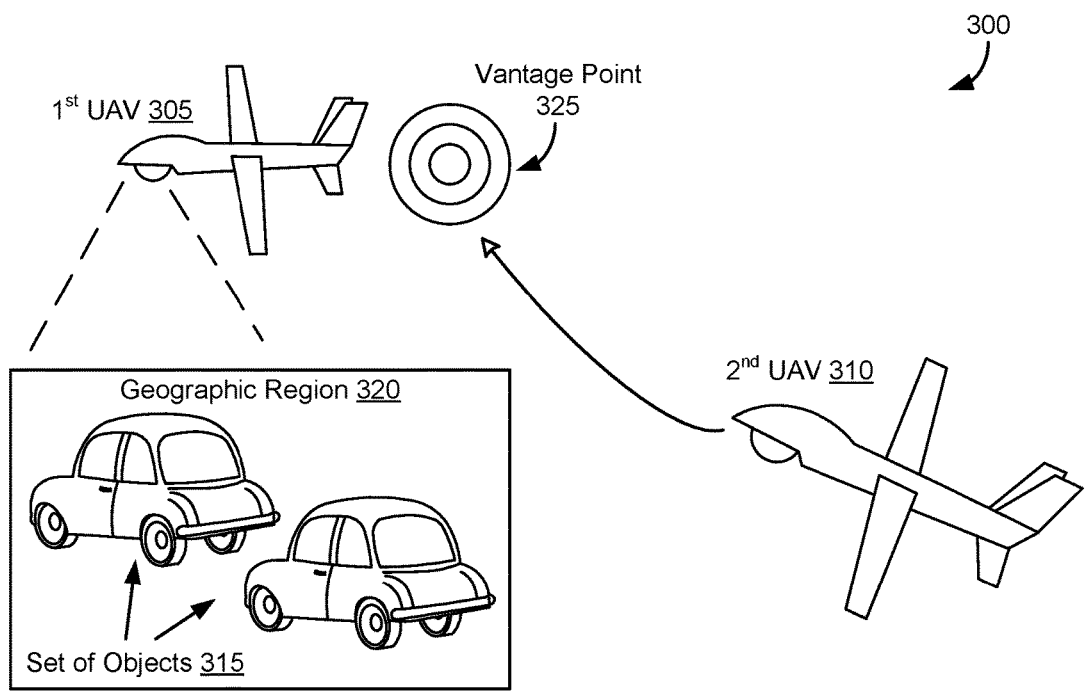
FIG. 3A is a schematic block diagram illustrating one embodiment of target tracking handover by apparatus for automated tracking and detection of multiple targets.
Figure 3B:
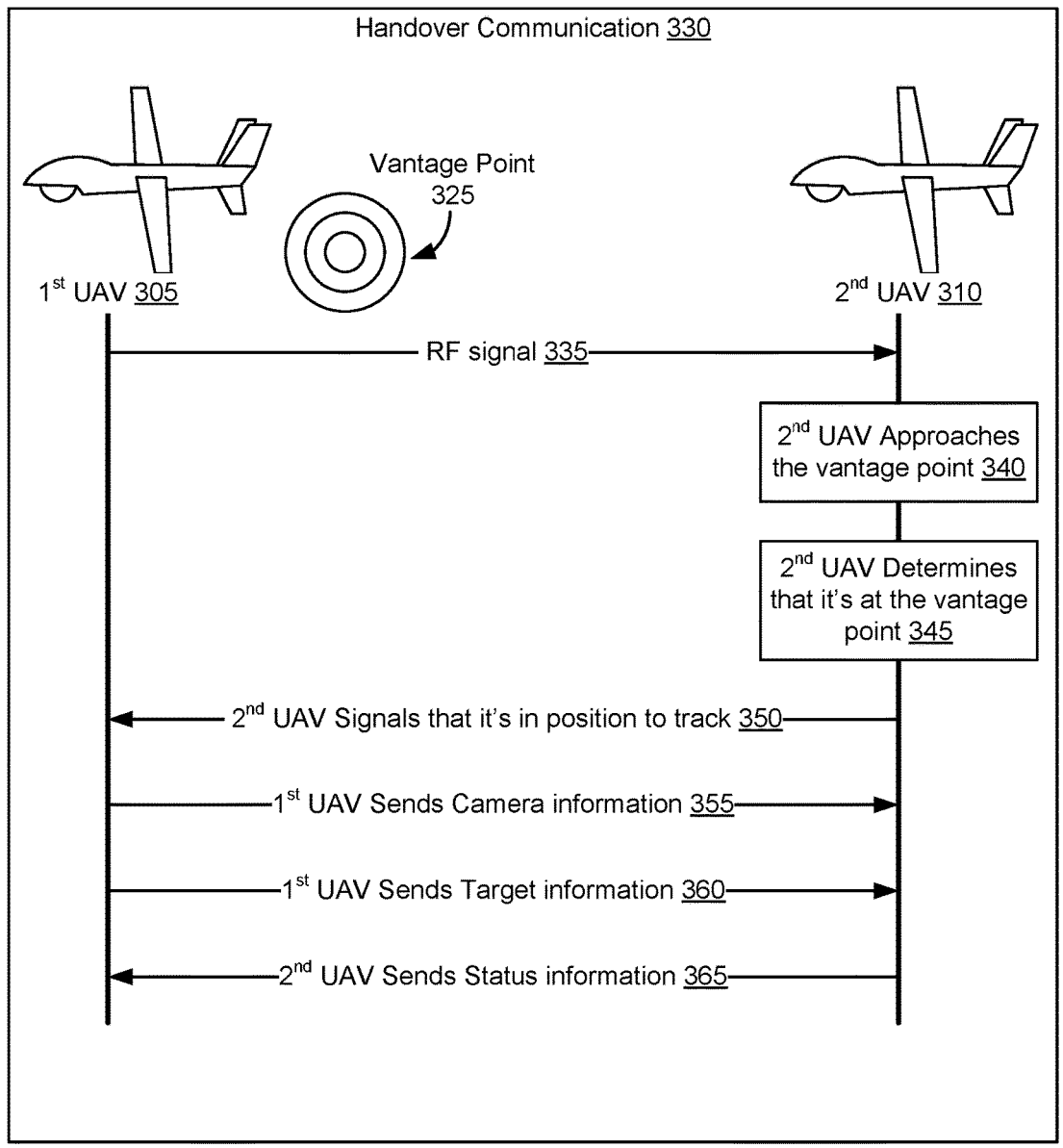
FIG. 3B is a schematic block diagram illustrating one embodiment of a communication exchange during the target tracking handover of FIG. 3A.

FIGS. 3A and 3B depict target tracking handover 300 between a first UAV 305 and a second UAV 310, according to embodiments of the disclosure. FIG. 3A shows an environment where target tracking handover 300 occurs. FIG. 3B shows handover communication 330 between the first UAV 305 and the second UAV 310 for effecting target tracking handover 300.

The first UAV 305 is tracking a set of objects 315 located at a geographic region 320. The set of objects 315 may include one or more objects of interest selected from a plurality of targets located at the geographic region 320. The first UAV 305 may use a combination of motion- and feature-based tracking to track the set of objects 315. In one embodiment, the second UAV 310 is configured to take over tracking duties of the first UAV 305. In another embodiment, the second UAV 310 is configured to share tracking duties with the first UAV 305 and using.

In one embodiment, the first UAV 305 may hand over tracking duties to the second UAV 310, e.g., due to a change in the mission of the first UAV 305, due to the first UAV 305 needing to refuel/recharge, or for other reasons. In some embodiments, the second UAV 310 may be used to supplement and/or enhance tracking of the set of objects 315. For example, the second UAV 310 may include additional equipment (e.g., infrared camera) or higher quality equipment used to supplement surveillance by the first UAV 305.

The first UAV 305 may be an embodiment of the electronic device 105 discussed above with reference to FIGS. 1 and 2. Similarly, the second UAV 310 may be an embodiment of the electronic device 105. Accordingly, the first UAV 305 and the second UAV 310 may each include a VMTT module 120. The VMTT module 120 may use a combination of homography and recursive-RANSAC to compensate for platform movement of the UAV 305/310 and filter out noise, spurious returns, artifacts, and other false positives, as discussed above.

In order for the second UAV 310 to take over and/or supplement tracking of the set of objects 315, the second UAV 310 must reach a vantage point 325. The vantage point 325 is a location in proximity to the first UAV 305 where the second UAV is able to observe all the objects (including the set of objects 315) that the first UAV 305 is tracking. Thus, the vantage point 325 allows the second UAV 310 to capture image data of the geographic region 320. The vantage point 325 is defined with respect to the first UAV 305 and is not occupied by the first UAV 305, therefore as the first UAV 305 moves, then the vantage point 325 also moves. While depicted as a single location, in some embodiments the vantage point 325 is a range of candidate vantage points which allow the second UAV 310 to observe all the objects that the first UAV 305 is tracking.

In one embodiment, a command station, such as the monitoring station 145 discussed above, instructs the second UAV 310 to navigate to specific coordinates corresponding to the vantage point 325, for example using a satellite navigation system or similar navigational aid. The command station may identify a current location of the first UAV 305, calculate an appropriate vantage point 325 based on the current location, and instruct the second UAV 310 to navigate to the vantage point 325.

However, not all UAVs will have satellite navigation systems as these may be unnecessarily bulky, heavy, expensive, and/or power-hungry for a UAV. For example, a small UAV may not have the payload capacity and/or the power capacity to include a satellite navigation module. In another example, the cost of a satellite navigation module may price the overall UAV beyond a budgetary limit and/or goal. Accordingly, an alternative (or supplemental) solution is disclosed for guiding the second UAV 310 to the vantage point 325 without use of the satellite navigation system or similar navigational aid.

In one embodiment, the first UAV 305 may transmit 335 a radio frequency ("RF") signal detectable by the second UAV 310. For example, the first UAV 305 may transmit at a specific frequency and/or using a specific pattern/modulation. The second UAV 310 detects and follows the RF signal. In some embodiments, the second UAV 310 may include a directional antenna in order to easily identify a direction to the first UAV 305 based on the received RF signal. Thus, the second UAV 310 may use the RF signal as a direction finder to identify a bearing that leads to the first UAV 305.

The second UAV 310 approaches 340 the first UAV 305. The second UAV 310 monitors the signal strength of the RF signal. In one embodiment, when the signal strength exceeds a predetermined threshold, the second UAV 310 signals 350 to the first UAV 305 that it is within sufficient range of the first UAV 305. In another embodiment, when the signal strength exceeds a predetermined threshold, the second UAV 310 may switch to a secondary system, such as a small LIDAR system or camera system the more precisely guides the second UAV to the vantage point 325.

Once the second UAV 310 determines 345 that it is at the vantage point 325, and thus within a predetermined distance of the first UAV 305 (e.g., as determined based on the RF signal strength and/or the secondary system), the second UAV 310 signals 350 the first UAV 305 that it is positioned to take over/supplement tracking of the set of objects 315. The first UAV 305 then transmits camera information 355 to the second UAV 310.

The camera information 355 allows the second UAV 310 to point its camera at the geographic region 320 (and at the set of objects 315). The camera information 355 may include camera parameters, camera bearing, a position of the set of objects 315 relative to the first UAV 305, and the like. As there may be multiple objects/targets at the geographic region 320, the first UAV 305 also transmits target information 360 to the second UAV 310. The target information 360 identifies the set of objects 315 from among the objects/targets at the geographic region 320. For example, the first UAV 305 may transmit information regarding estimated states (e.g., position, velocity, acceleration) of the set of objects 315 as obtained using the VMTT module 120. As another example, the target information may include features used to track the set of objects 315.

Thus, the second UAV 310, upon reaching the vantage point 325 and pointing its camera at the geographic region 320, begins tracking objects within its view (including the set of objects 315). As discussed above, the second UAV 310 uses recursive-RANSAC for multiple objects tracking. The VMTT module 120 generates a set of tracked targets with the position data (or data relating to other estimated states) and an error-bound for the position data (or estimates states). The second UAV 310 uses the target information 360 to identify which one (or ones) of the set of tracked targets correspond to the set of objects 315.

In some embodiments, the first UAV 305 (which also includes a recursive-RANSAC module 215) transmits state data and error-bound information as part of the target information 360. Because the first UAV 305 and the second UAV 310 are not co-located at the same physical location, there will be differences in the coordinate systems used by the first UAV 305 and the second UAV 310. Therefore, the first UAV 305 cannot merely send position and variance (e.g., error-bound) information as there is no guarantee that this will be sufficient information for the second UAV 310 to unambiguously identify the set of objects 315 from the multiple objects/targets within the tracked area (e.g., the geographic region 320). For example, there will be rotational and/or translational bias between the results of the recursive-RANSAC modules 215 in the first UAV 305 and in the second UAV 310.

However, the set of objects 315 have very specific motion which will be unaffected by the rotational and/or translational bias between the results of the different recursive-RANSAC modules 215. Because recursive-RANSAC is a motion-based algorithm, it outputs information about how an object is moving. The set of objects 315 can be uniquely identified using its path/motion profile, because an object moves the same way between frames captured by the first UAV 305 and frames captured by the second UAV 310.

In certain embodiments, there may be several similar targets at the geographic region 320 that are moving as a group (e.g., in formation). In such embodiments, motion-based tracking will only be able to identify the group using the path/motion profile information accordingly, the target information 360 may also include features for the set of objects 315. The second UAV 310 may use these included features to supplement the motion-based tracking, so as to uniquely identify a specific object in the group using the included features.

Accordingly, the target information 360 may include a number of objects that comprise the set of objects 315, path information for each object in the set of objects 315, feature information for each object in the set of objects 315, position data for each object in the set of objects 315, error bounds of the position data, a window of time during which the target information 360 is valid (e.g., the 2-5 seconds), and the like. In certain embodiments, the first UAV 305 periodically (e.g., every second) transmits the camera information 355 and target information 360 (collectively referred to as "handover information") in response to the second UAV 310 being at (or within a predetermined distance of) the vantage point 325.

The second UAV 310 transmits tracking status information 365 to the first UAV 305 upon receiving the handover information (e.g., the camera information and target information). The tracking status information 365 indicates whether or not the second UAV 310 has identified and is tracking each object in the set of objects 315. Once the second UAV 310 is has unambiguously identified each object in the set of objects 315 from its own video data, the second UAV 310 will transmit tracking status information 365 to the first UAV 305 indicating that target tracking handover is complete. Otherwise, the second UAV 310 transmits tracking status information 365 to the first UAV 305 indicating that target tracking handover is incomplete. While target tracking handover is incomplete, the first UAV 305 will continue to periodically transmit handover information to the second UAV 310.

While the above description refers to handover of tracking responsibilities from the first UAV 305 to the second UAV 310, the same steps are used when the second UAV 310 supplements tracking of the first UAV 305. For example, when supplementing tracking, the second UAV 310 navigates to the vantage point 325 and signals the first UAV 305 wherein the first UAV 305 periodically transmits the camera information 355 and target information 360 until the second UAV 310 transmits tracking status information 365 indicating that it has unambiguously identified (and is tracking) each object in the set of objects 315 (e.g., a target tracking handover completion message). The difference between the two scenarios is that with target tracking handover, the first UAV 305 will cease tracking the set of objects 315 upon receiving the target tracking handover completion message, whereas with supplemental tracking the first UAV 305 will continue to track the set of objects 315 upon receiving the target tracking handover completion message.

Supplemental tracking by multiple camera platforms (e.g., multiple UAVs) reduces the error bound of position information for an object of interest (e.g., the set of objects 315). As multiple camera platforms (e.g., the first UAV 305 and the second UAV 310) track the same objects of interest, the tracking information (e.g., position information, path/motion information, etc.) from multiple camera platforms can be combined using data fusion algorithms to reduce the error bounds.

In some embodiments, tracking information is shared among the multiple camera platforms (e.g., multiple UAVs) with each set of tracking information including metadata identifying a timeframe in which it is valid (e.g., time of capture) and a camera platform that captured the tracking information. This metadata prevents destructive information cycles where a first camera platform unknowingly receives its own data from a different platform and erroneously reduces its error bound based on its own data.

As an example of the destructive information cycle, a first UAV 305 may pass tracking information to a second UAV 310. The second UAV 310 pass tracking information to a third UAV, which in turn may pass tracking information to the first UAV 305. Typically, upon receiving tracking information, the second UAV 310 fuses its observations (tracking information) with received tracking information, and passes on the fuse data as tracking information. The data fusion process minds the data in a way that makes it hard to determine, afterwards, which piece of information came from which source.

If the second UAV 310 and third UAV are unable to view the object of interest (e.g., due to the building being in the way), and they have no information of their own to fuse before passing on to the next camera platform. Thus, the first UAV 305 may receive its own unmodified tracking information from the third UAV without knowing that it has been unmodified and may then artificially reduce its own error bound by using its own tracking information. To avoid artificially reducing the error bound, the tracking information may include metadata to identify the source of the tracking information, a timeframe in which it is valid, and/or fusion flag indicating whether the tracking information includes a fusion of information from two different sources.

Figure 4:
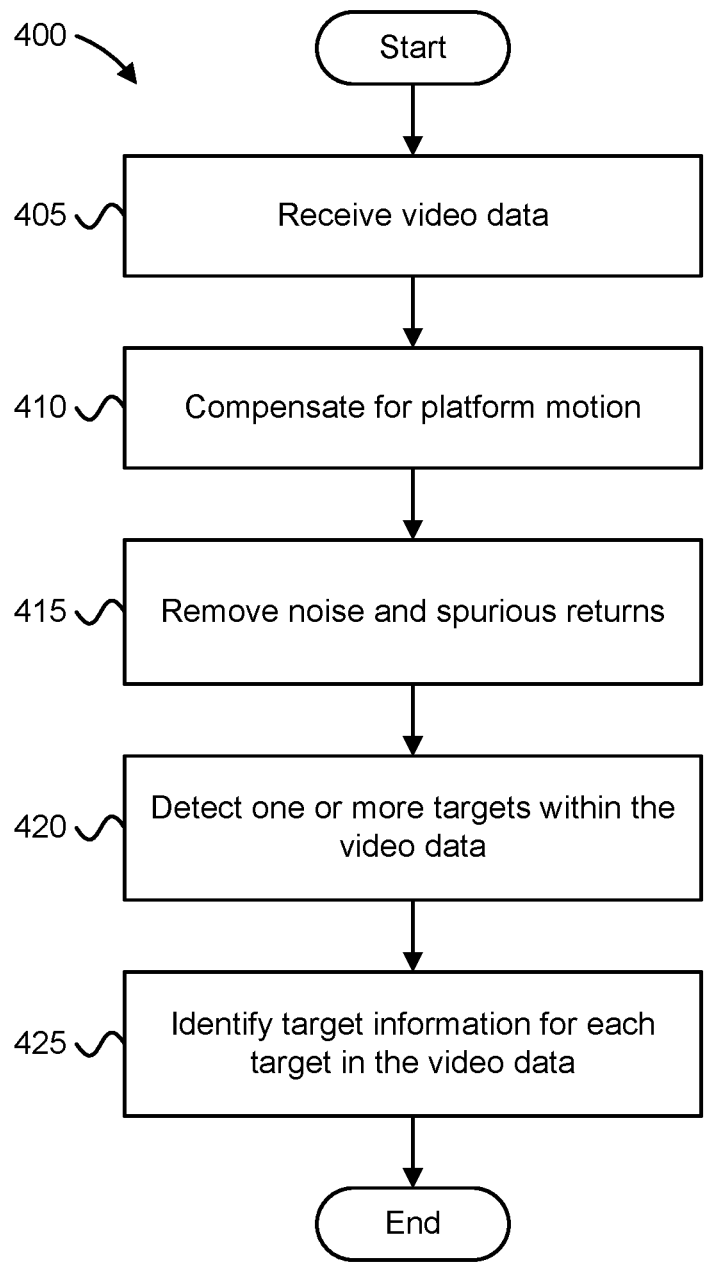
FIG. 4 is a schematic flow chart diagram illustrating one embodiment of a method for automated tracking and detection of multiple targets.

FIG. 4 is a schematic flow chart diagram illustrating a method 400 for automated tracking and detection of multiple targets, according to embodiments of the disclosure. In one embodiment, the method 400 is performed by the electronic device 105. In another embodiment, the method 400 may be performed by the apparatus 200. Alternatively, the method 400 may be performed by a processor 110 and a computer readable storage medium, such as the memory 115. The computer readable storage medium may store code that is executed by the processor 110 to perform the functions of the method 400.

The method 400 begins and receives 405 video data. In one embodiment, the image capture module 205 receives 405 the video data via a camera module 125. The video data may include one or more video frames, each video frame comprising image data.

The method 400 compensates 410 for platform motion in the video data. In one embodiment, the image processing module 210 compensates 410 for the platform motion in the video data. In some embodiments, compensating 410 for the platform motion includes generating a homography matrix, as discussed above with reference to FIG. 1. Camera rotation and/or camera translation parameters may be extracted from the homography matrix and used to cancel out platform motion in the video data. In certain embodiments, the homography matrix is estimated using angular rate measurements, to simply computation of the homography.

The method 400 removes 415 noise and spurious returns from the video data. In one embodiment, the recursive-RANSAC module 215 removes 415 noise and spurious returns from the video data. In some embodiments, removing 415 noise and spurious returns includes applying a recursive-RANSAC algorithm to video data. In certain embodiments, removing 415 noise and spurious returns includes adjusting recursive-RANSAC parameters to avoid filtering out expected movement of objects within the image data.

The method 400 detects 420 one or more targets within the video data. In one embodiment, the recursive-RANSAC module 215 detects 420 one or more targets within the video data. In some embodiments, detecting 420 the one or more targets within the video data includes identifying regions within the video data showing expected motion (e.g., showing motion along one or more expected paths). In another embodiment, detecting 420 the one or more targets within the video data includes feature-based detection and/or motion-based detection (e.g., initializing a new track using recursive-RANSAC).

The method 400 identifies 425 target information for each target in the video data and the method 400 ends. In one embodiment, the target information module 220 identifies 425 target information for each target in the video data. In some embodiments, the target information includes a number of targets in the video data, path information for each target, feature information for each target, position data for each target, error bounds of the position data, a window of time during which the target information is valid.

Figure 5:
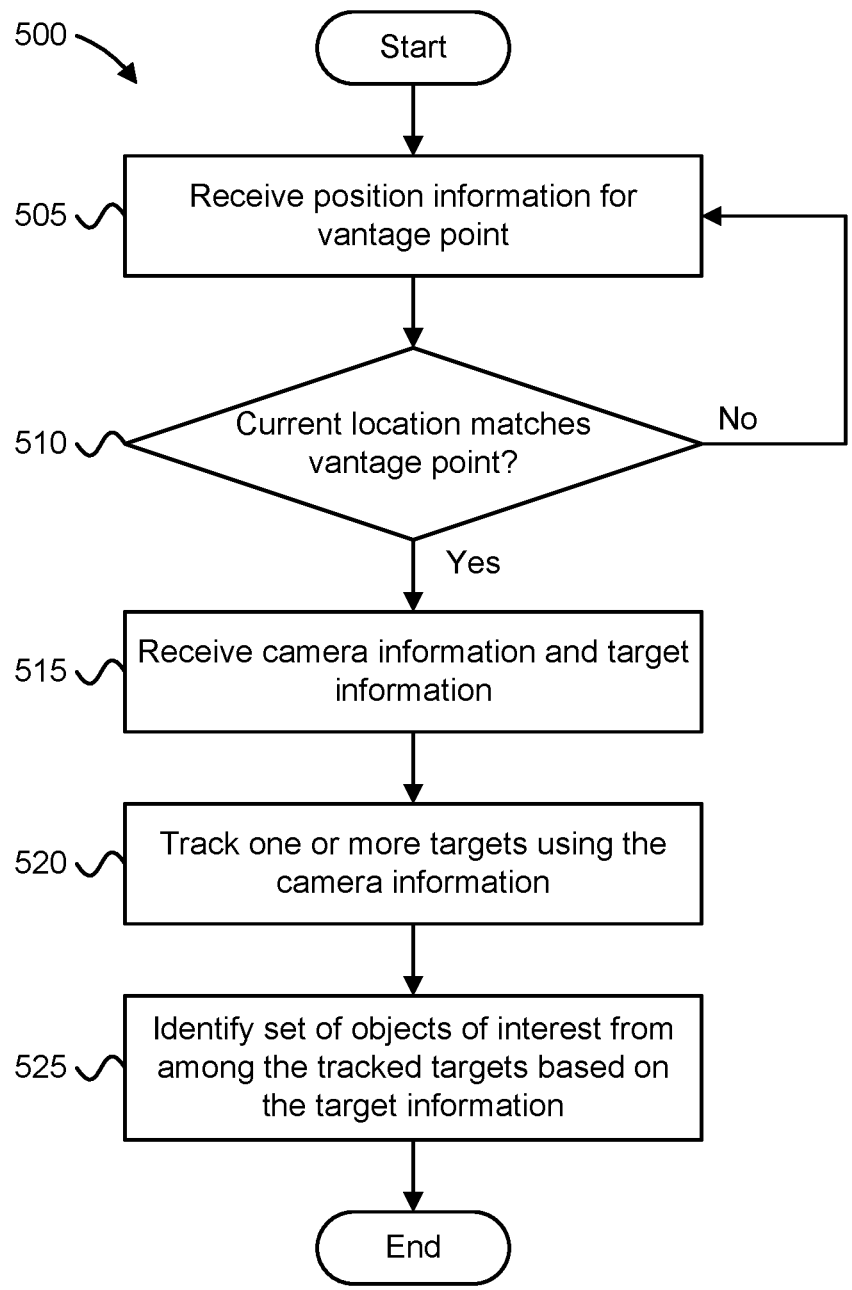
FIG. 5 is a schematic flow chart diagram illustrating one embodiment of a target tracking handover method.

FIG. 5 is a schematic flowchart diagram illustrating a method 500 for target tracking handover, according to embodiments of the disclosure. In one embodiment, the method 500 is performed by electronic device 105. In another embodiment, the method 500 may be performed by the apparatus 200. Alternatively, the method 500 may be performed by a processor 110 and a computer readable storage man medium, such as the memory 15. The computer readable storage medium may store code that is executed by the processor 110 to perform the functions of the method 500.

The method 500 begins and receives 505 position information for a vantage point. In one embodiment, the RF positioning module 225 receives 505 the position information for a vantage point 325. In one embodiment, receiving 505 the position information for the vantage point includes detecting a specific RF signal and determining bearing information from the RF signal, wherein the position information for the vantage point comprises the bearing information. In other embodiments, a satellite navigation system receives 505 the position information for a vantage point 325. In one embodiment, receiving 505 the position information for the vantage point includes receiving coordinates of the vantage point. In some embodiments, receiving 505 the position information includes generating navigation instructions for reaching the vantage point.

The method 500 determines 510 whether a current location matches the vantage point. In one embodiment, the RF positioning module 225 and/or the secondary positioning module 230 determines 510 whether the current location matches the vantage point. In other embodiments, a satellite navigation system determines 510 whether the current location matches the vantage point. If the current location matches the vantage point, then the method 500 receives 515 camera information and target information. Otherwise, if the current location does not match the vantage point, then the method 500 continues to receive 505 position information for the vantage point.

In one embodiment, a communications hardware 130 receives 515 the camera information and target information. Receiving 515 the camera information and target information may include requesting the camera information and target information from a nearby camera platform. The camera information may include information for pointing the camera at a geographic region in which a set of objects of interest is located. The target information may include information uniquely identifying the set of objects of interest.

The method 500 then tracks 520 one or more targets within the geographic region based on the camera information. In one embodiment, the VMTT module 120 tracks 520 the one or more targets. In some embodiments, tracking 520 the set of objects within the geographic region is an embodiment of the method 400 for automated tracking detection of multiple targets. For example, tracking 520 the set of objects may include receiving 405 video data, compensating 410 for platform motion in the video data, removing 415 noise and spurious returns in the video data, detecting 420 one or more targets within the video data, and identifying 425 target information for each target in the video data.

The method 500 identifies 525 the set of objects of interest from among the tracked one or more targets and the method 500 ends. In one embodiment, the target tracking module 220 identifies 525 the set of objects of interest from among the tracked targets. In some embodiments, identifying 525 the set of objects of interest includes signaling the nearby camera platform upon identifying 525 the set of objects of interest.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automated detection and tracking of multiple targets, comprising:
   receiving video data, wherein the video data comprises a sequence of video frames;
   compensating for platform motion in the video data;
   removing noise and spurious returns from the video data;
   detecting one or more targets within the video data, wherein detecting one or more targets within the video data comprises applying a recursive random sample consensus algorithm to the video data to generate contiguous tracks for each moving object in the video data; and
   identifying target information for each target in the video data.

2. The method of claim 1 further comprising:
   receiving position information for a vantage point;
   determining whether current location matches the vantage point;
   receiving camera information and target information in response to the current location matching the vantage point; and
   identifying a set of objects of interest from among the detected one or more targets in the video data based on the target information.

3. The method of claim 2, further comprising handing over target tracking from a first camera platform to a second camera platform in response to the second camera platform arriving at the vantage point, wherein the second camera platform receives the camera information and target information from the first camera platform.

4. The method of claim 2, wherein receiving video data comprises controlling a camera based on the camera information to acquire the video data.

5. The method of claim 1, wherein compensating for platform motion comprises applying a geometric transformation to frames of the video data.

6. The method of claim 5, wherein the geometric transformation is based on movement data captured by an inertial measurement unit (IMU) coupled to a camera platform, wherein the video data is captured from the camera platform.

7. The method of claim 1, wherein removing noise and spurious returns comprises using a recursive random sample consensus algorithm to filter the video data.

8. The method of claim 1, further comprising:
   generating a motion model for each detected target;
   receiving a new frame of video data;
   projecting each detected target onto the new frame of video data; and
   updating the motion model based on the projections.

9. The method of claim 1, wherein the target information comprises one or more of: a number of objects of interest, path information for each object of interest, feature information for each object of interest, position data for each object of interest, error bounds of the position data, and a window of time during which the target information is valid.

10. An apparatus comprising:
    a camera that captures video data, wherein the video data comprises a sequence of video frames;
    a processor; and
    a memory that stores code executable by the processor to:
    compensate for camera motion in the video data;
    process the compensated video data to remove noise and spurious returns;
    detect one or more targets within the processed video data, wherein detecting one or more targets within the processed video data comprises applying a recursive random sample consensus algorithm to the video data to generate contiguous tracks for each moving object in the video data; and
    identify target information for each target in the processed video data.

11. The apparatus of claim 10, wherein the processor further:
    receives position information for a vantage point;
    determines whether current location matches the vantage point;
    receives camera information and target information from a second camera in response to the current location matching the vantage point;
    identifies a set of objects of interest from among the detected one or more targets in the video data based on the target information; and
    takes over tracking of the set of objects from the second camera.

12. The apparatus of claim 10, wherein compensating for camera motion comprises transforming frames of the video data using a homography matrix, wherein the homography matrix is generated using one or more of: inertial measurement unit data and satellite positioning data.

13. The apparatus of claim 10, wherein processing the compensated video data to remove noise and spurious returns comprises the processor using a recursive random sample consensus algorithm to filter the video data.

14. The apparatus of claim 10, wherein detecting one or more targets within the processed video data comprises the processor:
    generating a difference image from the video data;
    masking moving feature points in the video data using the difference image; and
    grouping the moving feature points into moving objects.

15. The apparatus of claim 14, further comprising the processor generating motion models for each moving object in the video data.

16. The apparatus of claim 15, further comprising the processor:
    testing new data points obtained from the video data to determine whether the data points are inlier or outlier of an existing motion model;
    updating a particular motion model in response to a new data point being an inlier to the particular motion model; and
    generating a new motion model in response to the new data point being an outlier to all existing motion models.

17. The apparatus of claim 15, further comprising the processor removing redundant motion models and keeping only a predetermined number of the motion models.

18. A program product comprising a non-transitory computer readable storage medium that stores code executable by a processor, the executable code comprising code to perform:
- receiving video data, wherein the video data comprises a sequence of video frames;
- compensating for platform motion in the video data;
- filtering out removing noise and spurious returns from the compensated video data;
- detecting one or more targets within the filtered video data, wherein detecting one or more targets within the filtered video data comprises applying a recursive random sample consensus algorithm to the video data to generate contiguous tracks for each moving object in the video data; and
- identifying target information for each target in the filtered video data.

19. The program product of claim 18, wherein the code is further executable by the processor to:
- receive position information for a vantage point;
- determine whether current location matches the vantage point;
- receive camera information and target information from a second camera in response to the current location matching the vantage point;
- identify a set of objects of interest from among the detected one or more targets in the video data based on the target information; and
- take over tracking of the set of objects from the second camera.

20. The program product of claim 18, wherein the code is further executable by the processor to:
- generate motion models for each of the one or more targets object in the filtered video data;
- test new data points from the video data to determine whether the data points are inlier or outlier of an existing motion model;
- update a particular motion model in response to a new data point being an inlier to the particular motion model; and
- generate a new motion model in response to the new data point being an outlier to all existing motion models.

* * * * *